United States Patent Office

3,416,604
Patented Dec. 17, 1968

3,416,604
EPOXY RESIN GROUTING FLUID AND METHOD
FOR STABILIZING EARTH FORMATIONS
Roger F. Rensvold, Duncan, Okla., assignor to Halliburton Company, Duncan, Okla., a corporation of Delaware
No Drawing. Filed Mar. 20, 1967, Ser. No. 624,173
12 Claims. (Cl. 166—33)

ABSTRACT OF THE DISCLOSURE

This patent describes a novel grouting fluid comprising an epoxy resin and an alkylamine wherein each alkyl group is a tertiary alkyl group containing from about 4 to about 8 carbon atoms, and its use in stabilizing and sealing of earth formations. Epoxy resins utilized herein are normally the polyglycidyl ethers of organic diphenols, e.g., polyglycidyl ethers of 2,2-(4-hydroxyphenyl) propane, with Epon 820 and Epon 828 being among the preferred resins. Solid fillers, e.g., silica flour, may also be included in the present grouting fluids.

BACKGROUND OF THE INVENTION

The field of invention in the present patent relates to grouting fluids for the stabilization and sealing of earth formations.

The permeability characteristics of soil and geological formations are of considerable importance, particularly in the drilling and producing of wells. Serious problems have been encountered in passages or channels in the earth due to the leakage of water from subterranean springs or from the normal water table into oil wells through porous strata of the earth. In addition, during drilling, large quantities of valuable oil well drilling muds are often lost when the mud, under pressure, passes from the well out into porous formations, such as gravel, wash, limestone, sandstone and weak formations such as shale. This is commonly referred to as lost circulation. Accordingly, it can be seen that there is a real need for the stabilization and sealing of loose or porous earth formations to improve strength and reduce water permeability.

Previously, various polymeric water-based gels have been proposed for use in earth stabilization and sealing. However, these gels are limited in their utility because, in many situations, high formation temperatures are encountered. The gels are unstable under high temperature conditions due to the dehydration which takes place.

Another type of grouting fluid sometimes used for earth stabilizations is that based upon the urea-formaldehyde resins. These resins cure under acid conditions. In formations which are highly alkaline in nature, it is not possible to use these resins, since the necessary acidity for curing cannot be artifically provided. Various base-cured materials have also been suggested. However, it has been found that none of these materials possess the low viscosity, long pot life and pumping time that are necessary to permit injection of the grout at pressures which do not create the risk of fracturing or otherwise disturbing the formation. The present invention is distinguished in that it provides a grout which can be mixed in large batches and held for long periods without setting, is capable of injection at pressures which do not fracture incompetent formations, has a viscosity suitable for effective formation penetration, and readily sets to a rigid material under the conditions prevailing in the formation.

SUMMARY OF THE INVENTION

Briefly, the present invention comprises a novel grouting fluid comprising an epoxy resin and a tertiary alkyl primary, secondary or tertiary amine wherein the alkyl groups each contain from about 4 to about 8 carbon atoms. The present invention also comprehends the stabilization and/or sealing of earth formations with the novel grouting fluids by the injection of the fluid into such formations and permitting the fluid to harden in situ.

More particularly, the present invention comprises a method of stabilizing and/or sealing earth formations by the injection of a solution containing an epoxy resin comprising the polyglycidyl ether of a diphenol and a tertiary alkyl primary, secondary or tertiary amine wherein the alkyl groups each contain from about 4 to about 8 carbon atoms.

The novel grouting fluids of the present invention are characterized by several significant properties, including long pot life at ambient temperatures, low viscosity, the ability to set without additional catalyst, and controlled fluid time by the addition of predetermined quantities of additional catalyst such as the organic amines. The grouting fluids have sufficient pumping time so that they can be squeezed into the formation without exceeding the fracturing pressure. Also, the grouting fluids of this invention have a low exotherm which allows large quantities of the fluid to be mixed on the surface without premature setting being triggered by the evolution of heat.

Thus, it is an object of this invention to provide a novel grouting composition for use in the stabilization of earth formations, which is particularly adapted to the stabilization and/or sealing of high temperature formations and in alkaline environments.

It is a major object of this invention to provide a grouting composition which is high temperature and alkaline compatible and capable of injection into the formation below the fracturing pressure.

It is also the object of the present invention to provide a process for the stabilization of earth formations utilizing grouting composition containing an epoxy resin and a tertiary alkyl primary, secondary or tertiary amine wherein the alkyl groups each contain from about 4 to about 8 carbon atoms.

Yet another object of the present invention is to provide a grouting composition having a long pot life at ambient temperatures, low viscosity, high pumpability, and a low exotherm.

These and other objects and advantages of the present invention will be apparent to those skilled in the art.

DESCRIPTION OF THE PREFERRED EMBODIMENTS

As used herein, "earth" refers to sand, clay, gravel, formation fines and other loose or incompetent formations. "Earth" also refers to consolidated or competent formations which contain conduits. The conduits may be capillaries such as found in sandstone, vugular passages such as found in limetone, or cracks and fractures such as found in fractured shales, granite, or schist. Thus, there is included surface soil, sub-soil and lower geological formations. A consolidation and/or sealing of formations three feet or more below the earth surface are particularly of interest in the present invention.

Various additives may be utilized in the grouting composition of the present invention, including conventional epoxy resin additives such as the organic polyamines, i.e., diethylene triamine and N-tallow bis-amino propylamine (having an epoxy combining weight per epoxy group of 95 and a viscosity at 25° C. of about 30 centipoise—hereinafter referred to as XC–95) used as auxiliary catalysts, and fillers such as silica flour.

The grouting fluids of the present invention are sufficiently liquid to permit the incorporation therein of a substantial amount of solid fillers such as silica flour. For example, it is possible to combine as much as 175 parts by weight, or more, of silica flour per 100 parts, by weight, of catalyzed resin in the grouting fluid.

Preferably, the tertiary alkylamine is used in up to about a stoichiometric amount based on the epoxy resin. In the case of tertiary octylamine, the optimum amount corresponds to about 33 parts by weight per 100 parts resin; and in the case of tertiary butylamine, about 20 parts by weight per 100 parts resin.

The epoxy resins utilized in the practice of the present invention are normally the polyglycidyl ethers of organic diphenols. One preferred epoxy resin for use in the present invention is Epon 828 resin made by the Shell Chemical Corporation. This material is a homolog of the diglycidyl ether of 2,2-(4-hydroxyphenyl) propane. It is a liquid at room temperature, has an epoxide equivalent of from 175 to 210, an average molecular weight of 350–400, and a viscosity of from 5,000 to 15,000 centipoises at 25° C. Another preferred epoxy resin is Epon 820 which is identical in all respect to Epon 828 except that its viscosity has been reduced to about 4,000 to 10,000 centipoises at 25° C. by the addition of about 3% by weight of phenyl glycidyl ether.

The following examples are presented solely to illustrate the invention and should not be recorded as limiting in any way. In the examples, the parts and percentages are by weight, unless otherwise indicated.

*Example I*

The viscosity of epoxy resins containing known amounts of tertiary alkylamines was determined by a Brookfield viscometer, model LVF. Unless otherwise noted, all viscosity determinations were made at room temperature.

TABLE I

[Viscosity of Epoxy-t-butylamine solutions at room temperature]

| Concentration of t-butylamine (parts per 100 parts epoxy resin=phr.) | Viscosity, centipoise | |
|---|---|---|
| | Epon 820 | Epon 828 |
| 0 | 7,800 | |
| 10 | 1,105 | 957 |
| 20 | 184 | 195 |
| 30 | 71.8 | |
| 50 | 23.5 | 38.5 |
| 70 | 10.5 | |
| 100 | | 12.5 |

TABLE II

[Viscosity—time—relationship of Epon 820—t-butyl-amine solution at 140° F. (20 parts t-butylamine per 100 parts of resin).]

Elapsed time, min.: Viscosity, centipoise
4 _____ ¹ 57.2
12 _____ ¹ 25.5
33 _____ ¹ 23.7
45 _____ 32
66 _____ 127
92 _____ 2425
100 _____ 3030
114 _____ 5050
120 _____ 6420
138 _____ 14560

¹ The decrease in viscosity was due to the heating of the solution after being placed in the water bath.

TABLE III

[Viscosity of epoxy-t-octylamine solutions at room temperature]

| Concentration of t-octylamine, parts per 100 parts of resin | Viscosity, centipoise | |
|---|---|---|
| | Epon 820 | Epon 828 |
| 0 | | 9,450 |
| 5 | | 4,600 |
| 10 | 1,114 | 2,010 |
| 15 | | 1,050 |
| 20 | 356 | 478 |
| 30 | 145 | 177 |
| 40 | 77.5 | |
| 50 | 49.2 | 49.1 |
| 70 | 25 | 26.8 |
| 100 | | 15.8 |

The gel time as used hereinafter is defined as the time in minutes required for a given mixture of the epoxy resin and tertiary alkyamine to reach a viscosity of approximately 75,000 centipoises. "Mol-rez" gel time meters, made by the American Petrochemical Corporation, Minneapolis, Minnesota, were used. The weight employed is a No. 9 Pfleuger bass casting sinker. Each weighed approximately 3.5 grams. Specific conditions for each test were tabulated as follows:

TABLE IV

[Gel times of epoxy-t-butylamine solutions (20 phr. t-butylamine)]

| Epoxy resin | DETA,* phr. | Gel time, Minutes | | |
|---|---|---|---|---|
| | | Room temp. | 120° F. | 140° F. |
| Epon 828 | 0 | 724 | 230 | |
| | 2 | 306 | 103 | |
| Epon 820 | 0 | | | 196 |
| | 2 | | | 60 |
| | 4 | | | 21 |
| | 6 | | | 17 |
| | 8 | | | 15 |

*Diethylene triamine.

The compressive strength determinations were obtained by crushing cylinders of No. 1 Oklahoma dry sand, consolidated by impregnating a sand column at room temperature with the resin mixture, and curing under controlled conditions. Cylinder dimensions are 1″ in diameter by 1½″ long. The sand column is pre-saturated with synthetic brine comprising 92.16% by weight tap water, 6.94% by weight sodium chloride, 0.52% by weight calcium chloride, and 0.38% by weight magnesium chloride. The resin mixture is forced through the sand column by 15 p.s.i.g. air pressure. Each column of sand weighs 100 grams on the dry basis. 100 grams of resin solution was used for each test. The resin was forced through the sand column, displacing the brine, until the top surface of the resin volume contacted the top of the sand column. The pressure was relieved at this point, the tube was disconnected from the air supply and placed in a water bath to cure. Specific conditions of cure time, temperature and catalyst concentration are tabulated, together with the compressive strength values obtained in the following table:

TABLE V.—COMPRESSIVE STRENGTHS OF RESIN-IMPREGNATED SAND CORES AT 24 HOURS

| Concentration of DETA,* phr. | Compressive strength, p.s.i. | | | |
|---|---|---|---|---|
| | Epon 828 resin, 100 pbw; t-octylamine, 33 pbw. | | Epon 828 resin, 100 pbw; t-butylamine, 20 pbw. | |
| | 120° F. | 140° F. | 120° F. | 140° F. |
| 0 | 222 | 3,304 | 15,426 | 15,206 |
| 2 | 6,512 | 3,338 | 14,132 | 11,181 |
| 4 | 5,073 | 3,083 | 6,212 | 14,048 |
| 6 | 7,703 | 968 | | 18,152 |
| 8 | 8,904 | | | |

*Diethylene triamine.

*Example II*

Compressive strength tests were conducted as follows: Glass cylinders, 32 (mm.-O.D.) by 7″ long were coated with silicone resin and baked. A column of bubble-free brine-saturated sand was established in the tube in the following manner: A 1-hole rubber stopper with a short piece of glass tubing was inserted in the bottom of the tube. A small piece of wire gauze was placed on the stopper and covered with about 1″ of 8–12 mesh sand. The tube was then almost completely submerged in a vertical position in a column of brine. 100 grams of Oklahoma No. 1 sand were slowly but steadily poured into the tube and allowed to settle. Any bubbles adhering to the walls of the tube were dislodged and worked to the surface. Another ½″ layer of 8–12 mesh sand was put on top of the column and the tube was inserted in a frame which prevented the subsequently applied air pressure from pushing out either the top or bottom stopper. Another glass tube of about the same dimensions was fastened to the top stopper of the first tube, acting as a reservoir for the resin. Another 1-hole stopper, fitted with a hose to the air pressure, was clamped to the top of the upper tube, but only after 100 grams of catalyzed resin solution had been poured in. 10 to 15 p.s.i.g. air pressure was applied and the resin was forced through this sand column. The pressure was relieved as soon as the top of the injected resin coincided with the top of the sand column. A short piece of glass rod replaced the tubing in the bottom stopper, and the resin-impregnated sand column was placed vertically in a water-bath at the proper temperature. At the end of the prescribed time, the tube was sectioned into 1½" lengths with a saw. The glass tubing was cracked off, and the resin-sand cores were crushed on the compressive strength machine. The compressive strength of the silica flour resin slurries was determined by filling 32-mm. O.D. glass tubes with the catalyzed resin slurry, curing and crushing in the same manner as above described.

TABLE VI.—SILICA FLOUR SLURRIES

[The specimens were cured for 19 hours at 95° F. Resin formula: Standard resin solution (Epon 820, 100 pbw.; tertiary octylamine 33 pbw.), 100 pbw.; XC-95, 20 pbw.; water, 1 pbw.]

| Parts silica flour by weight | Compressive strength p.s.i. |
|---|---|
| 50 | 2394 |
| 100 | 3192 |
| 125 | 3547 |
| 150 | 3192 |
| 175 | 3486 |
| 200 | 2873 |

TABLE VII.—RESIN CONSOLIDATED SAND COLUMNS

[Cured 24 hours and crushed at cure temperature]

| Pbr. XC-95 | Compressive strength, p.s.i. | |
|---|---|---|
| | 120° F. | 140° F. |
| 0 | 115 | 318 |
| 4 | 344 | 1,918 |
| 8 | 569 | 207 |
| 12 | 4,781 | 205 |
| 16 | 3,508 | 326 |
| 20 | 686 | 181 |
| 24 | 510 | 155 |

Exotherms for various size batches of Epon 820—tertiary octylamine using 8 p.b.w. XC–95 and 1 p.b.w. water are shown on the following tables:

TABLE VIII

| Resin volume | Maximum temp., °F. | Time to reach max. temp., min. | Time to reach 5,000 cps. viscosity, min. |
|---|---|---|---|
| 2 gallons | 310 | 155 | 190 |
| 1 gallon | 305 | 165 | 196 |
| 1.6 quarts | 297 | 180 | 213 |
| 1 quart | 266 | 175 | 223 |
| 1 pint | 154 | 255 | 295 |
| ½ pint | 132 | 285 | 355 |

TABLE IX

| API test schedule | Depth, feet | Max. temp., °F. | Time to 5,000 cps., min. pbw. XC-95 | | | | |
|---|---|---|---|---|---|---|---|
| | | | 0 | 2 | 4 | 8 | 12 |
| 8 | 14,000 | 206 | 147 | 110 | | 75 | 59 |
| 17 | 10,000 | 186 | 172 | 117 | 92 | 70 | |
| 6 | 8,000 | 159 | | 144 | 104 | | |

The foregoing data clearly illustrate that the grouting fluids of my invention have the properties of viscosity and pot-life which are compatible with large scale mixing, and are capable of easy pumping and injection at moderate pressures. The compressive strength data show that after curing in place, the grouting fluids form a strong, load-supporting structure. This combination of properties is believed to be unique in the grouting art. Many and various uses of these materials will commend themselves to those skilled in the art. Likewise, it is apparent that formulations other than those illustrated are possible. For example, while all of the tertiary alkylamine shown in the above examples are primary amines, secondary and tertiary amines wherein each of the alkyl groups are tertiary, and containing from about 4 to about 8 carbon atoms, are also useful. Other amines within the above-defined group including tertiary amyl primary amine are also suitable for use in the practice of this invention.

Having fully described the invention, it is intended that it be limited only by the lawful scope of the appended claims.

I claim:

1. A novel pumpable grouting fluid having a long pot life and useful for the stabilization and sealing of earth formations which comprises an epoxy resin and an alkylamine wherein each alkyl group is a tertiary alkyl group containing from about 4 to about 8 carbon atoms.

2. The fluid of claim 1 wherein the alkylamine is t-octylamine.

3. The fluid of claim 1 wherein the alkylamine is t-butylamine.

4. The fluid of claim 1 wherein the epoxy resin is the polyglycidyl ether of 2,2-(4-hydroxyphenyl) propane.

5. The fluid of claim 1 wherein the alkylamine is a primary amine.

6. The method of stabilizing and sealing earth formations which comprises contacting the formation with a grouting fluid comprising an epoxy resin and an alkylamine wherein each alkyl group is a tertiary alkyl group containing from about 4 to about 8 carbon atoms, and permitting said fluid to set and thereby seal said formation.

7. The method of claim 6 wherein the alkylamine is t-octylamine.

8. The method of claim 6 wherein the alkylamine is t-butylamine.

9. The method of claim 6 wherein the epoxy resin is the polyglycidyl ether of 2,2-(4-hydroxyphenyl) propane.

10. The method of claim 6 wherein the alkylamine is a primary amine.

11. The method of stabilizing and sealing an incompetent earth formation in the vicinity of the borehole of an oil well which comprises injecting into the formation at a pressure less than the fracturing pressure a novel grouting fluid comprising an epoxy resin and an alkylamine wherein each alkyl group is a tertiary alkyl group containing from about 4 to about 8 carbon atoms and permitting said fluid to set and thereby seal said formation.

12. The method of claim 11 wherein the alkylamine is a primary amine.

References Cited

UNITED STATES PATENTS

| | | | |
|---|---|---|---|
| 2,717,885 | 9/1955 | Greenlee | 260—47 |
| 2,837,497 | 6/1958 | Delmonte | 260—47 |
| 2,975,155 | 3/1961 | Capron et al. | 260—47 |
| 3,023,190 | 2/1962 | Damusis | 260—47 |
| 3,170,516 | 2/1965 | Holland et al. | 166—33 X |
| 3,208,525 | 9/1965 | Caldwell et al. | 166—33 |
| 3,291,213 | 12/1966 | Bezemer et al. | 166—33 |
| 3,308,884 | 3/1967 | Robichaux | 166—33 |
| 3,335,112 | 8/1967 | Marks | 260—47 |

STEPHEN J. NOVOSAD, *Primary Examiner.*

U.S. Cl. X.R.

260—47; 61—36